United States Patent [19]

Yamada et al.

[11] Patent Number: 5,370,980

[45] Date of Patent: Dec. 6, 1994

[54] SILVER HALIDE PHOTOGRAPHIC LIGHT-SENSITIVE MATERIAL

[75] Inventors: Taketoshi Yamada; Yasushi Usagawa; Akira Onishi; Yoshiko Ogawa; Shigeto Hirabayashi, all of Hino, Japan

[73] Assignee: Konica Corporation, Japan

[21] Appl. No.: 141,121

[22] Filed: Oct. 21, 1993

[30] Foreign Application Priority Data

Oct. 22, 1992 [JP] Japan .................................. 4-284481

[51] Int. Cl.⁵ ............................................. G03C 1/815
[52] U.S. Cl. ................................... 430/510; 430/517; 430/519; 430/522
[58] Field of Search ................. 430/510, 517, 519, 522

[56] References Cited

U.S. PATENT DOCUMENTS

| | | | |
|---|---|---|---|
| 2,266,441 | 12/1941 | Peterson | 95/88 |
| 3,540,888 | 11/1970 | Mee | 430/522 |
| 5,238,780 | 8/1993 | Takagi et al. | 430/517 |
| 5,290,669 | 3/1994 | Hirabayashi et al. | 430/517 |

FOREIGN PATENT DOCUMENTS

| | | | |
|---|---|---|---|
| EFA52711 | 1/1993 | European Pat. Off. | |
| 521668 | 1/1993 | European Pat. Off. | G03C 1/825 |
| 1597482 | 5/1970 | Germany | |
| 524500 | 8/1940 | United Kingdom | |

Primary Examiner—Jack P. Brammer
Attorney, Agent, or Firm—Jordan B. Bierman

[57] ABSTRACT

Disclosed is a silver halide photographic light-sensitive material comprising a support having thereon a hydrophilic colloidal layer comprising at least one silver salt of a compound having at least one acid group in the molecule, and the compound is represented by Formula I, Formula II or Formula III:

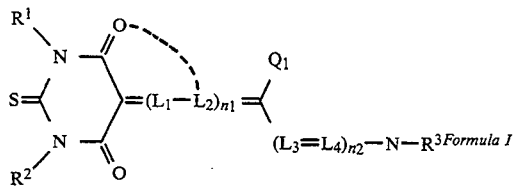

wherein $R^1$ and $R^2$ independently represent a hydrogen atom or a group selected from the group consisting of an alkyl group, an alkenyl group, an aryl group and a heterocyclic residue; $L_1$, $L_2$, $L_3$ and $L_4$ independently represent a methine group; $n_1$ is an integer of 0 to 3; $n_2$ is an integer of 0, 1 or 2 and $R^3$ represents an alkyl group or an alkenyl group. $Q_1$ represents a non-metal atom group necessary to complete a 5-membered or 6-membered heterocyclic ring;

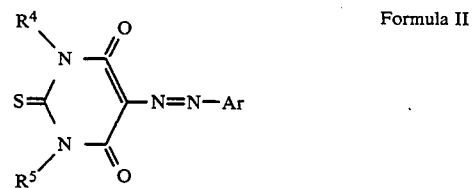

wherein $R^4$ and $R^5$ independently represent a hydrogen atom or a group selected from the group consisting of an alkyl group, an alkenyl group, an aryl group, and a heterocyclic residue provided that $R^4$ and $R^5$ are not hydrogen atoms at the same time, and Ar represents an aryl group; and

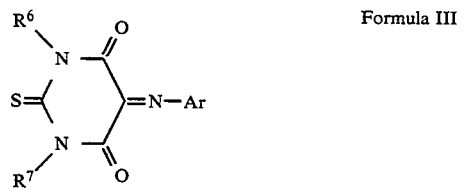

wherein $R^6$ and $R^7$ independently represent a hydrogen (Abstract continued on next page.)

atom or a group selected from the group consisting of an alkyl group, an alkenyl group, an aryl group, and a heterocyclic residue provided that $R^6$ and $R^7$ are not hydrogen atoms at the same time; and Ar represents an aryl group.

8 Claims, No Drawings

SILVER HALIDE PHOTOGRAPHIC LIGHT-SENSITIVE MATERIAL

FIELD OF THE INVENTION

The present invention relates to a silver halide photographic light-sensitive material containing a new non-diffusible dye, more specifically a silver halide light-sensitive photographic material which comprises a new non-diffusible dye exhibiting improved a bleaching of color during processing.

BACKGROUND OF THE INVENTION

Generally in the field of a silver halide photographic light-sensitive material (the following is named the light-sensitive material), it is well known to incorporate a dye in the photographic layer of the light-sensitive material in order to absorb the light of specific wave length or for the purpose of preventing antihalation, anti- irradiation or adjustment of light-sensitivity of the light-sensitive emulsion. Thus, a hydrophilic, colloidal layer has been conventionally colored with the above-mentioned dye. Among constitution layers of the above-mentioned light-sensitive material, the filter layer is usually located above the light-sensitive emulsion layer or between said emulsion layer and another emulsion layer and the role of the filter layer is to change the incident light which reaches the emulsion layer into a preferable spectral composition. The antihalation layer is provided in order to improve the sharpness of the image and it is usually provided at the back side of the support or between the light-sensitive emulsion layers.

This layer absorbs reflected light from the boundary surface between the emulsion layer and the support or from the rear surface of the support.

Moreover, the light-sensitive emulsion layer is further colored using a dye, whereby absorb harmful reflection or scattering light from the silver halide grain and improve sharpness of the image by preventing irradiation.

The dye used for such objects should satisfy a following various conditions. That is, the dye has an excellent absorption spectrum characteristic according to the utilization object, and is bleached completely in photographic processing, and the dye is easily dissolved away from the light-sensitive material in photographic processing. (d) After processing the stain with the dye will not be caused. The light-sensitive emulsion is not negatively affected about the fog and the desensitization, etc. Furthermore, the dye does not diffuse from the colored layer to another layer, and aging stability is excellent in aqueous solution or in the light-sensitive material and discoloration is not caused. The dyestuff should satisfy the above-mentioned various requirements.

To date, numerous investigations have been done in order to develop dyes which satisfy various requirements mentioned above. For example, the benzylidene dyes are proposed in U.S. Pat. Nos. 3,540,887, 3,544,325 and 3,560,214; Japanese Patent Publication No. 10578/1956, and Japanese Patent O.P.I. Publication No. 3623/1976, the oxonol dyes are proposed in British Patent No. 500,385 and Japanese Patent Publication No. 22069/1964; the merocyanine dyes are proposed in U.S. Pat. No. 2,493,747; and stryl dyes are proposed in U.S. Pat. No. 1,845,404.

Some of these conventional dyes relatively little affect emulsion performance, and a certain dye has the performances such as easily the bleaching, dissolving out, and discoloring during processing. However, these dyes were insufficient as to diffusion resistance. That is, when specific layer of two or more emulsion layers are selectively colored and use as filter layer or antihalation layer, diffusion to another layer is remarkable and the effect of the light absorption falls, and further undesirable spectral action is caused on the other layer.

Thus, as a means of selectively dying a particular hydrophilic colloid layer, there have been proposed the use of a mordant to immobilize the dye and the use of a non-diffusible dye. However, when the mordant is used, coating property is often poor, and the inhibition of the dye diffusion between the photographic layers is not sufficient. Moreover, the dissolving out of the dye during processing and bleaching effect are not sufficient. Further processing bath of high pH is required and, in addition, compatibility to a rapid processing is not sufficient.

Various researches relating to the method of using non-diffusible dyes have been done. Among them, the silver salt of the oxonol dye having a thio barbituric acid parent nucleus with a particular structure is disclosed in U.S. Pat. No. 1,077,049, 2,266,441 and 3,471,293.

Although, these known silver salts of dyes have a diffusion resistance in short storagelife, bleaching and dissolving out characteristics during process are not sufficient, and these dyes diffuse in long storage and further, these dyes have adverse effects on the photographic properties of the light-sensitive silver halide emulsion.

Thus, there is no dye meeting these requirements, there is strong demand for the development of such a dye.

SUMMARY OF THE INVENTION

Therefore, the first object of the present invention is to provide a silver halide light-sensitive photographic material comprising a dye which has an excellent absorption spectral characteristic and diffusion resistance in the silver halide emulsion layer or in a non-light-sensitive hydrophilic colloidal layer. The second object of the present invention is to provide a silver halide photographic light-sensitive material comprising a dye having bleaching and dissolving out properties during photographic processing and excellent compatibility to rapid photographic processing. The third object of the present invention is to provide a silver halide light-sensitive photographic material comprising a dye having no adverse effects, such as fogging and desensitization, on the photographic properties of the light-sensitive silver halide emulsion. The fourth object of the present invention is to provide a silver halide light-sensitive photographic material comprising a dye having no adverse effects in storage on the photographic properties of the light-sensitive silver halide emulsion.

DETAILED DESCRIPTION OF THE INVENTION

The objects of the present invention above have been accomplished by a silver halide photographic light-sensitive material comprising a silver salt of a compound which contains at least one acid group in the molecule, and the compound is represented by the following formulae I, II, and III.

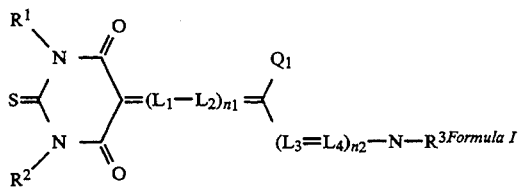

wherein $R^1$ and $R^2$ each represents a hydrogen atom, an alkyl group, an alkenyl group, an aryl group or a heterocyclic group; $L_1$ through $L_4$ independently represent a methine group; $n_1$ represents 0 to 3; $n_2$ represents an integer of 0 to 2; $R^3$ represents an alkyl group or an alkenyl group; $Q_1$ represents a group of non-metallic atoms necessary to form a 5- or 6-membered heterocyclic ring.

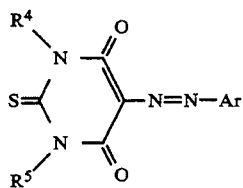

Formula II wherein $R^4$ and $R^5$ each represents a hydrogen atom, an alkyl group, an alkenyl group, an aryl group or a heterocyclic group provided that $R_4$ and $R_5$ are not hydrogen atoms at the same time; Ar represents an aryl group;

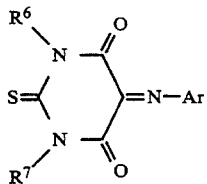

Formula III wherein $R^6$ and $R^7$ each represents a hydrogen atom, an alkyl group, an alkenyl group, an aryl group or a heterocyclic group; provided that $R^6$ and $R^7$ are not a hydrogen atom at the same time; Ar represents an aryl group.

The invention is detailed as follows. First of all, the compounds represented by the formulae I through III are described below.

With respect to Formulae I through III, examples of the alkyl groups represented by $R^1$ through $R^7$ include, methyl group, ethyl group, propyl group, isopropyl group, tert-butyl group, butyl group, cyclopentyl group, cyclohexyl group, etc. These alkyl groups may have been substituted by known substitutent by hydroxyl group, cyano group, sulfo group, and carboxyl group, halogen atom such as fluorine atom, chlorine atom, bromine atom, etc.; alkoxyl group, for example, methoxy group, ethoxy group, etc.; aryloxy group, for example, phenoxy group, 4-sulfophenoxy group, 2,4-disulfophenoxygroup, etc.; aryl group, for example, phenyl group, 4-sulfophenyl group, 2,5-di-sulfophenyl group, etc.; alkoxycarbonyl group, for example, methoxycarbonyl group, ethoxycarbonyl group, etc.; aryloxy carbonyl group, for example, phenoxy carbonyl group, etc. aryloxy carbonyl group, for example, phenoxy carbonyl group, etc.

Examples of the aryl group represented by $R^1$ through $R^7$ and Ar include phenyl group and a naphthyl group. These groups may be substituted by the alkyl groups represented by $R^1$ through $R^7$ and by the same substituents as specified for the alkyl groups. The substituent includes, for example, alkenyl group, aryl group, heterocyclic group, halogen atom, cyano group, sulfo group, a —$COR^8$ group, a —$CON(R^8)(R^9)$ group, a —$N(R^8)(R^9)$ group, a —$OR^8$ group, a —$SOR^8$ group, a —$SO_2R^8$ group, a —$SO_2N(R^8)(R^9)$ group, a —$N(R^8)COR^9$ group, a —$N(R^8)SO_2R^9$, a —$N(R^8)CON(R^9)(R^{10})$ group, a —$SR^8$ group, a —$COOR^8$ group, etc., wherein $R^8$ through $R^{10}$ independently represent a hydrogen atom and a group selected by the group consisting of an alkyl group, an alkenyl group, an aryl group, aryl group and a heterocyclic group.

Examples of the heterocyclic group represented by $R^1$ through $R^7$ include a pyridyl group, a thiazolyl group, a oxazolyl group, an imidazolyl group, a furyl group, a pyrrolyl group, a pyrazinyl group, a pyrimidinyl group, a pyridazinyl group, a purinyl group, a selenazoyl group, a sulfolanyl group, a piperidinyl group, a pyrazolyl group, a tetrazolyl group. These groups may be substituted by the alkyl group represented by $R^1$ through $R^7$ and by the same substituents as specified for the alkyl groups.

Examples of the alkenyl group represented by $R^1$ through $R^7$ include a vinyl group, an allyl group. These alkenyl groups may be substituted by the alkyl group represented by $R^1$ through $R^7$ and by the same substituents as specified for the alkenyl groups.

Examples of the heterocyclic group formed by $Q_1$ in formula I include heterocyclic rings described on pages 23 through 26 of Japanese Patent O.P.I. Publication No. 282832/1986 and the heterocyclic rings represented by the following formula:

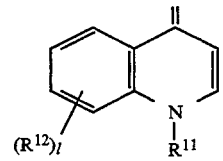

wherein, $R^{11}$ has the same definition as $R^1$ and $R^2$, $R^{12}$ represents a hydrogen atom, a halogen atom, an alkyl group, an alkenyl group, an aryl group, a heterocyclic group, a cyano group, a sulfo group, a —$COR^{13}$ group, a —$CON(R^{13})(R^{14})$ group, a —$N(R^{13})(R^{14})$ group, a —$OR^{13}$ group, a —$SOR^{13}$ group, a —$SO_2R^{13}$ group, a —$SO_2N(R^{13})(R^{14})$ group, a —$N(R^{13})COR^{14}$ group, a —$N(R^{13})SO_2R^{14}$ group, a —$N(R^{13}) CON(R^{14})(R^{15})$ group, a —$SR^{13}$ group, or a —$COOR^{13}$ group; $R^{13}$ through $R^{15}$ independently represent a hydrogen atom, an alkyl group, an alkenyl group, an aryl group or a heterocyclic group; 1 is an integer of 0 to 3.

Compounds represented by formulae I, II, or III comprise at least one acid group in the molecule.

Examples of the acid group include a sulfo group, a carboxyl acid group, a phosphonic acid group.

Typical examples of the compounds represented by formulae I through III are shown below. However, it should be understood that the present invention is by no means restricted to such specific examples.

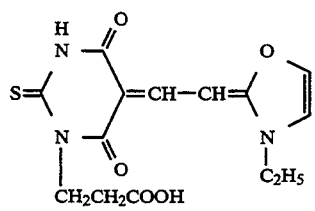
I-1
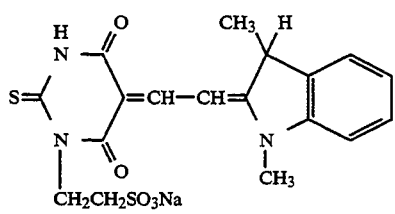
I-2
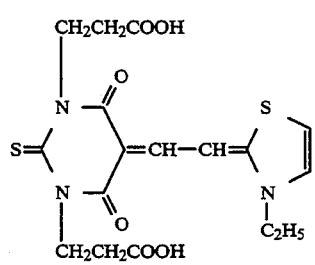
I-3
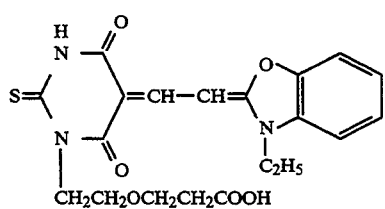
I-4
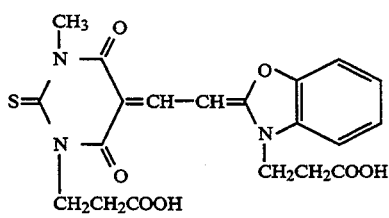
I-5
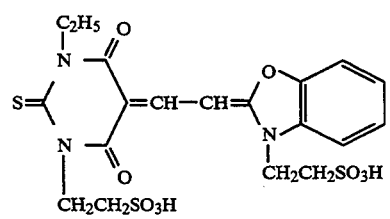
I-6
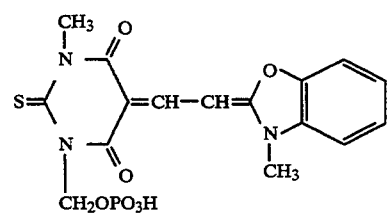
I-7
-continued
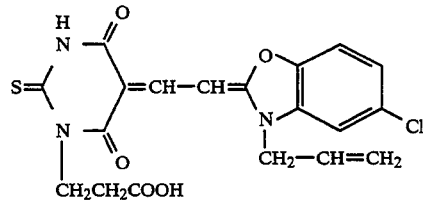
I-8
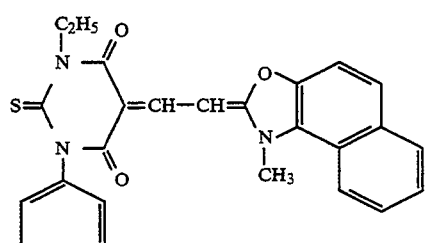
I-9
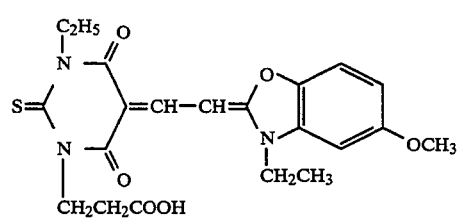
I-10
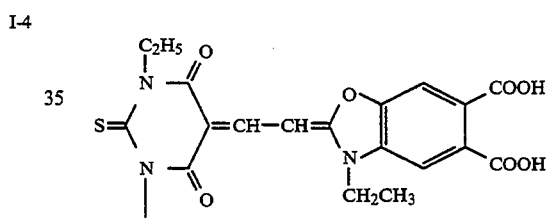
I-11
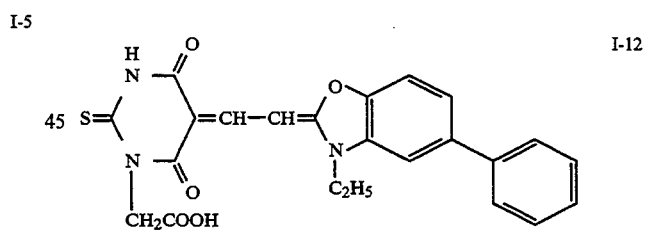
I-12
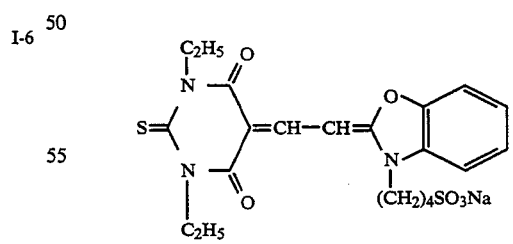
I-13
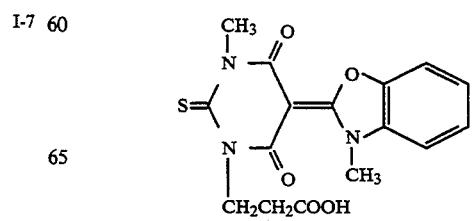
I-14

-continued
I-15
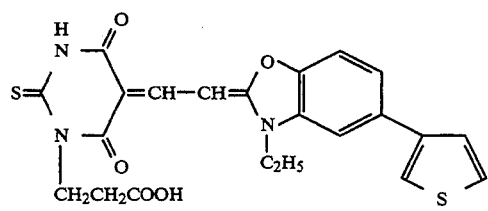
I-16
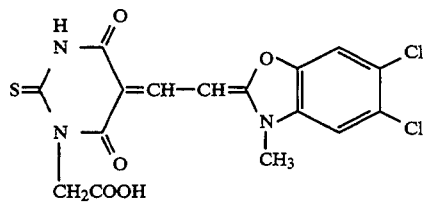
I-17
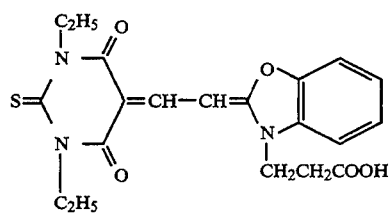
I-18
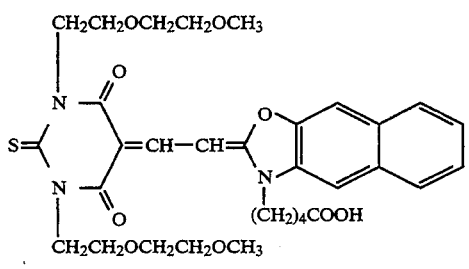
I-19
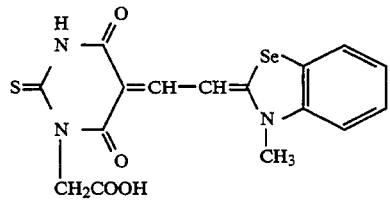
I-20
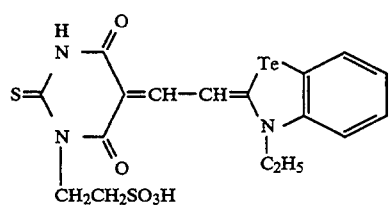
I-21
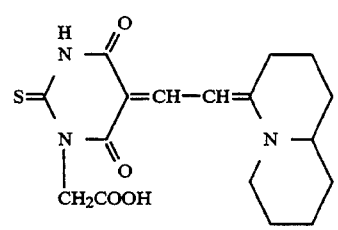
-continued
I-22
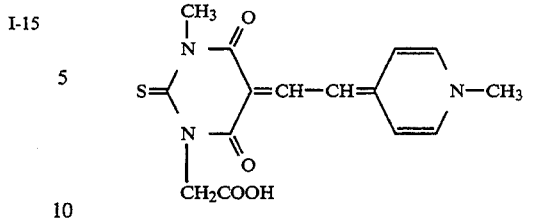
I-23
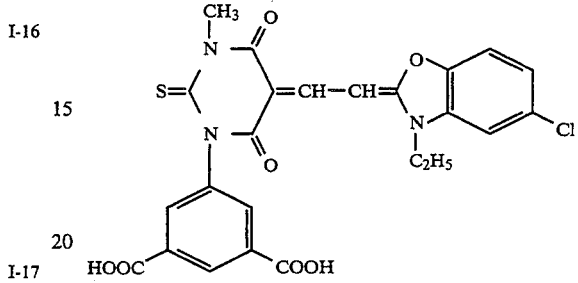
I-24
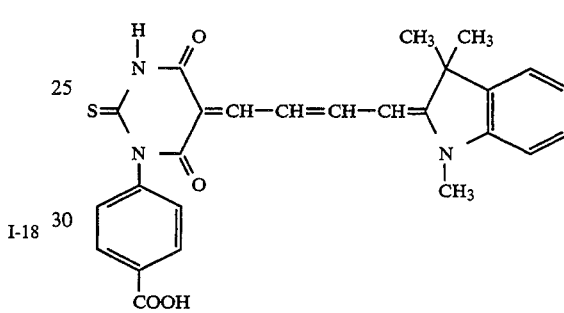
I-25
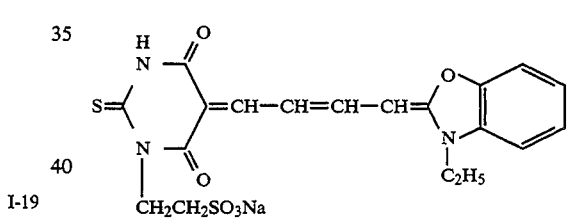
I-26
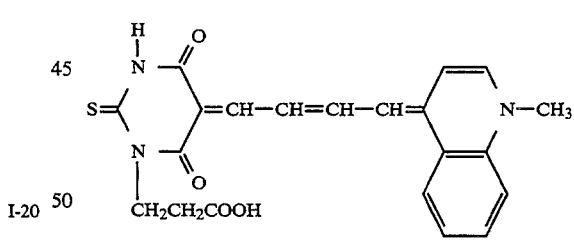
I-27
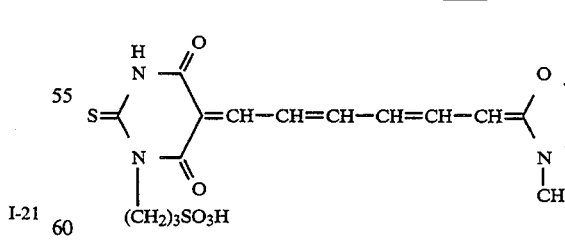
I-28
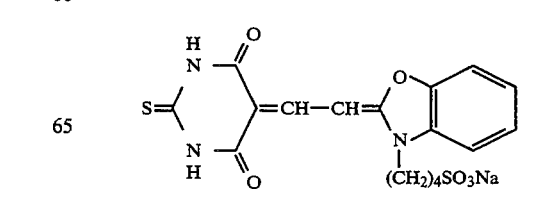

-continued
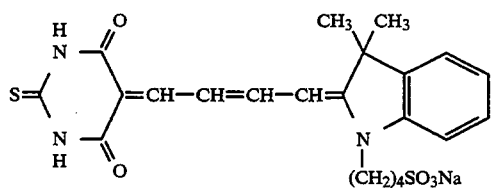 I-29
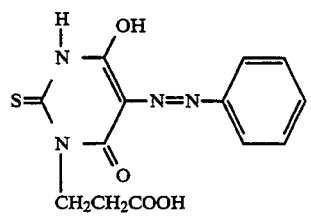 II-1
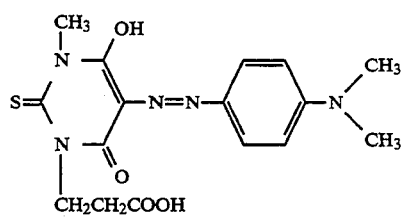 II-2
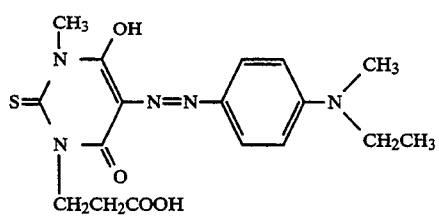 II-3
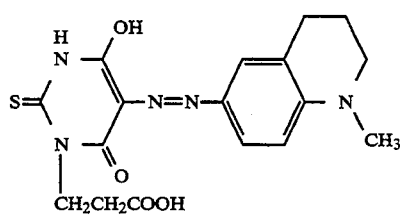 II-4
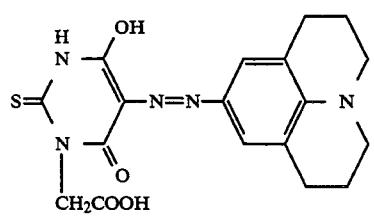 II-5
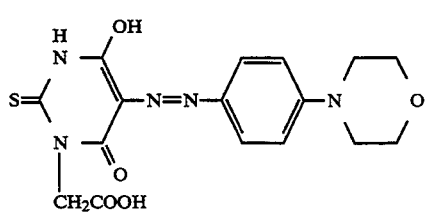 II-6
-continued
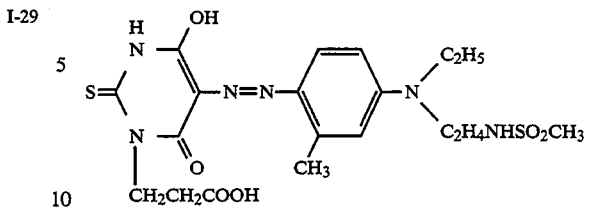 II-7
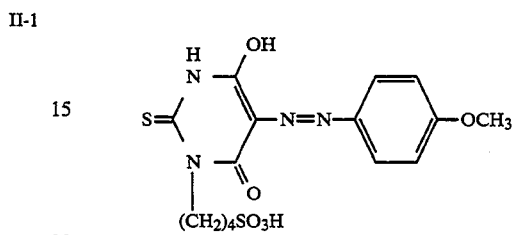 II-8
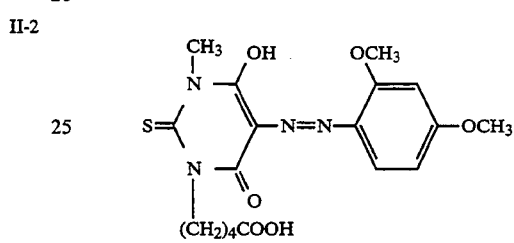 II-9
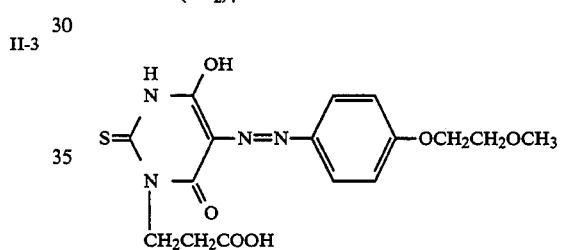 II-10
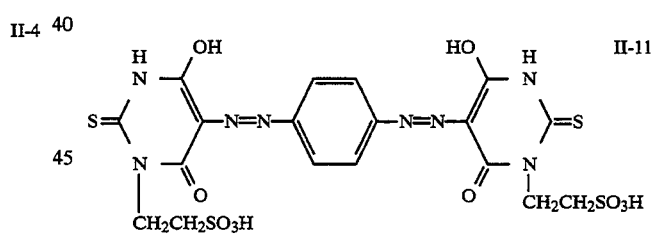 II-11
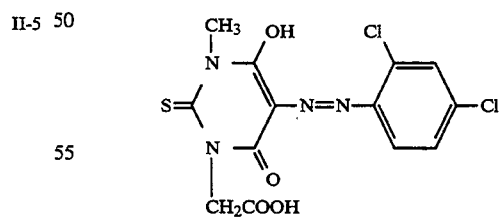 II-12
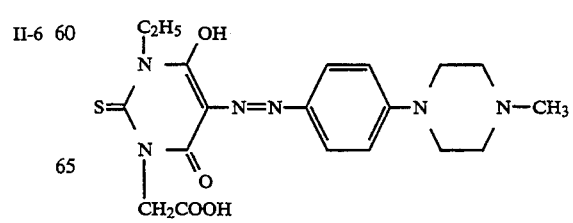 II-13

-continued
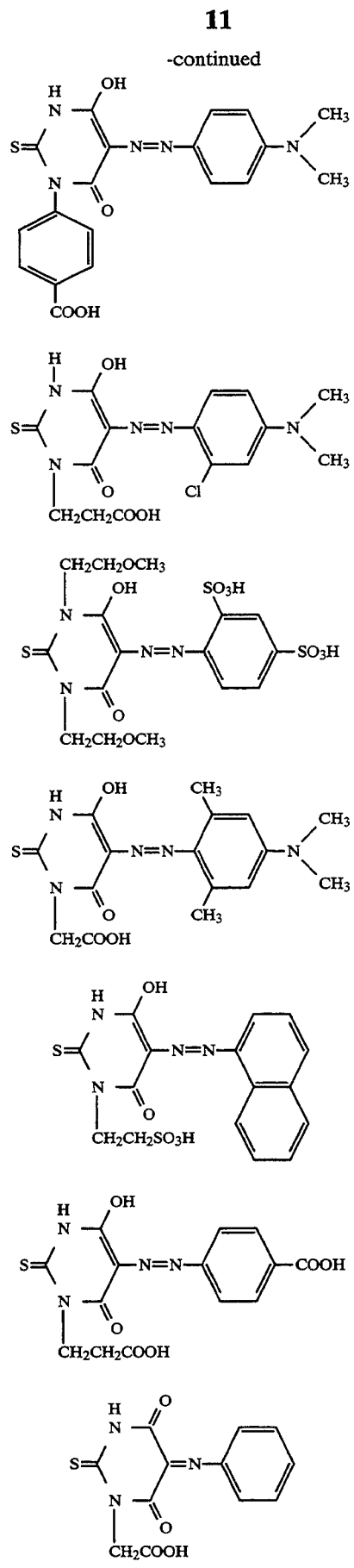
-continued
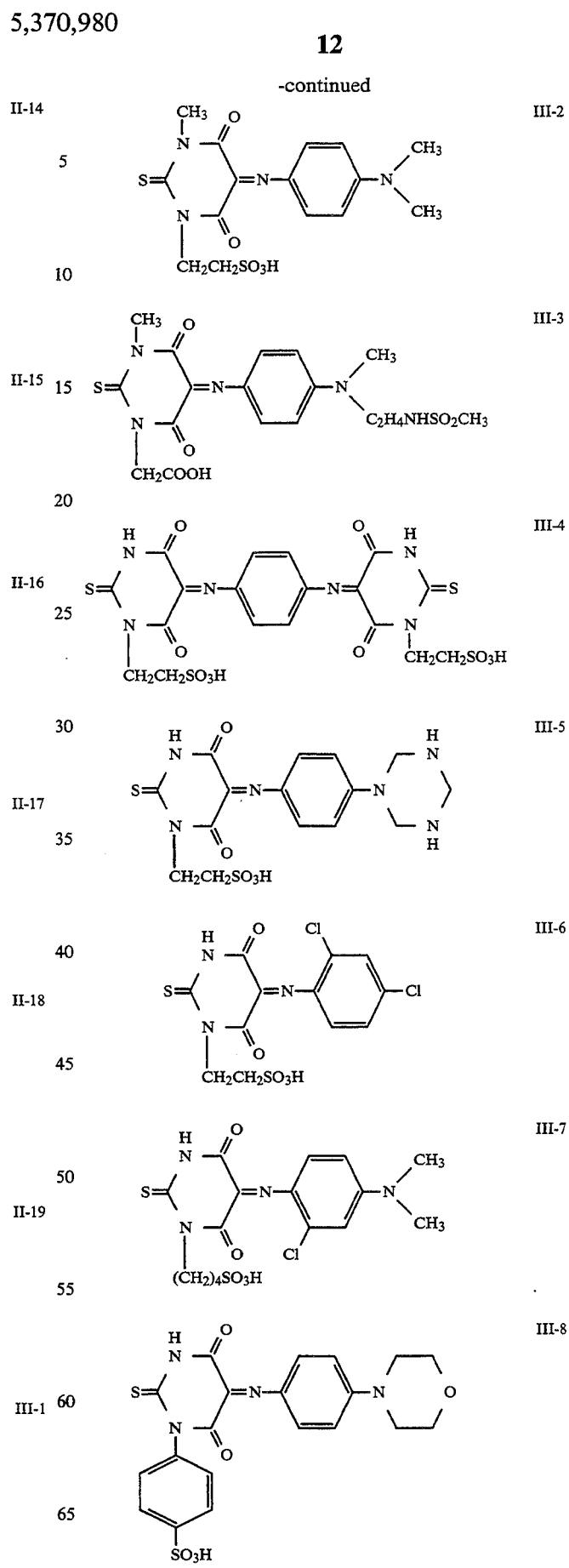

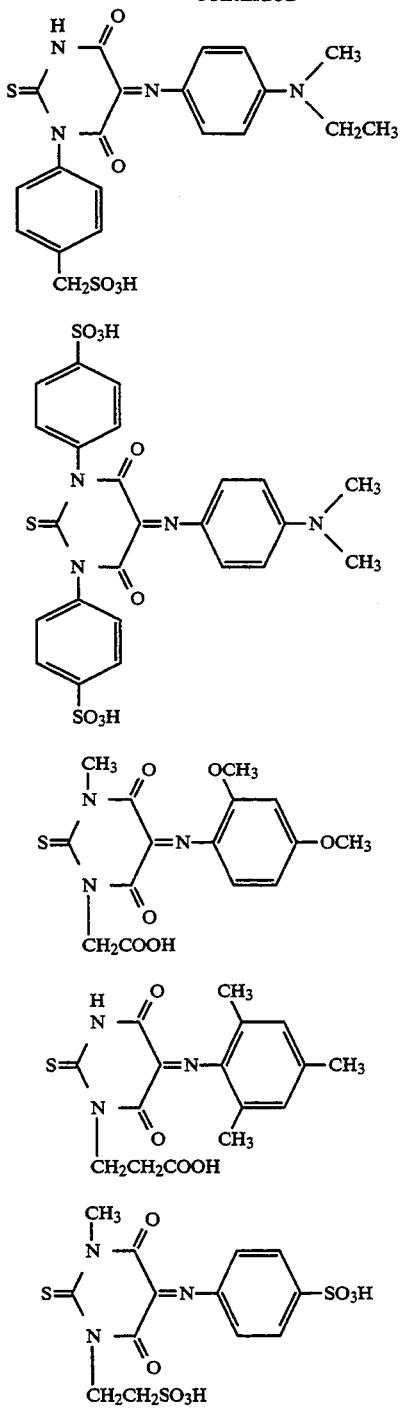

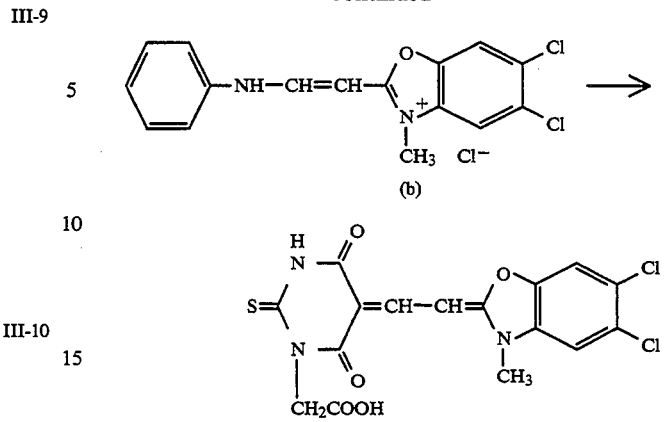

20.2 g of (a) and 37.3 g of (b) were dissolved in 150 ml of methanol and 44.0 ml of triethyl amine and refluxed for one hour. After condensing the mixture, it was treated with acetic acid, to obtain a dye. The dye was recrystallized from ethanol and obtained 28.5 g of dye was obtained. The structure of the dye was confirmed the same structure as I-16 by $^1$H-NMR and the mass spectrum.

The method preparing silver salts of these dyes and the method adding the silver salts to a light-sensitive material are proposed in British Patent No. 1,077,049 and U.S. Pat. No. 3,471,293.

In the light-sensitive material of the present invention, the silver salts of dyes represented by formulas I through VI can be used as anti-irradiation dyes in the silver halide emulsion layer, and can be sued as filter dyes or anti-halation dyes in non-sensitive hydrophilic colloid layers. Also, two or more silver salts of the dye of the present invention may be used in combination according to the purpose of use thereof, and may also be used in combination with other dyes, as long as the effect of the invention is not interfered with.

In the present invention, the amount of silver salt of dye added to the filter layer or anti-halation layer is preferably 0.05 to 2.0 g/m$^2$, more preferably 0.1 to 1.0 g/m$^2$. The amount of gelatin added to these layers is preferably 0.3 to 1.5 g/m$^2$, more preferably 0.5 to 1.0 g/m$^2$.

In the present invention, the ratio of the amount of silver salt of dye contained in the filter layer or anti-halation layer and the amount of gelatin added contained therein (amount of silver salt of dye added/amount of gelatin added) is normally not less than 0.1, preferably 0.1 to 2.0, and more preferably 0.2 to 1.0.

Examples of materials for the support of the light-sensitive material of the present invention include cellulose acetate, cellulose nitrate, polyester films such as polyethylene terephthalate films, polyolefin films such as polyethylene films, polystyrene films, polyamide films polycarbonate films, baryta paper, polyolefin-coated paper, polypropylene synthetic paper, glass plates and metals, which materials are properly selected according to the purpose of the use of the light-sensitive material.

Examples of hydrophilic colloids for the light-sensitive material of the present invention include gelatin, gelatin derivatives such as phthalated gelatin and benzenesulfonylated gelatin, water-soluble naturally-occurring polymeric substances such as agar, casein and alginic acid, synthetic resins such as polyvinyl alcohol and polyvinyl pyrrolidone, and cellulose derivatives Next, a few examples of synthesizing the compounds used in the present invention are given below:
Synthesis of exemplified compound (I-16)

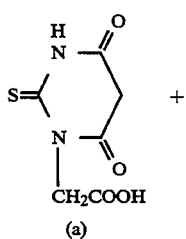

such as carboxymethyl cellulose, which substances may be used singly or in combination.

Examples of silver halide emulsions for the light-sensitive material of the present invention include those in common use for silver halide emulsion, such as silver chloride, silver bromide, silver iodide, silver chlorobromide, silver iodobromide and silver chloroiodobromide.

The silver halide emulsion used in the light-sensitive material of the present invention can be prepared by various methods, including the method described in Japanese Patent Examined publication No. 7772/1971 and the method described in U.S. Pat. No. 2,592,250, wherein a so-called conversion emulsion is prepared by first forming an emulsion of silver salt grains whose solubility product is higher than that of silver bromide, and then converting at least a part of these particles are converted to silver bromide salt or silver iodobromide salt. This silver halide emulsion can be sensitized with a chemical sensitizer, e.g., a sulfur sensitizer such as thiosulfate, allyl thiocarbamide, thiourea, allyl isothiocyanate or cystine, an active or inert selenium sensitizer, or a noble metal sensitizer such as potassium chloroaurate, auric trichloride, potassium auric thiocyanate, 2-aurothiabenzothiazolemethyl chloride or another gold compound, ammonium chloropalladate, sodium chloropalladate or another palladium compound, potassium chloroplatinate or another platinum compound or a ruthenium compound, or a combination thereof. This emulsion can also be subjected to reduction sensitization using a non-chemical sensitizer, and can be stabilized with a triazole, an imidazole, an azaindene, a benzothiazolium compound, a zinc compound, a cadmium compound a mercaptan or a mixture thereof, and can contain a sensitizing compound of the thioether type, quaternary ammonium type or polyalkylene oxide type.

The silver halide emulsion used in the light-sensitive material of the present invention can be spectrally sensitized with a sensitizing dye as necessary. Examples of sensitizing dyes which can be used include various dyes such as cyanine dyes, merocyanine dyes, complex cyanine dyes, oxonol dyes, hemioxonol dyes, styryl dyes, merostyryl dyes and streptocyanine dyes, which sensitizing dyes may be used singly or in combination.

In the light-sensitive material of the present invention, the emulsion layer and other hydrophilic colloid layers may contain wetting agents, plasticizers, film property improving agents and other additives such as glycerol, dihydroxyalkanes such as 1,5-pentanediol,ethylene bis-glycolate, bis-ethoxydiethylene glycol succinate, and water-dispersible fine granular polymer compounds obtained by emulsion polymerization. The light-sensitive material of the present invention can also contain photographic additives, including aldehyde compounds, N-methylol compounds such as N,N'-dimethylolurea, active halogen compounds such as mucohalogen acid, divinylsulfonic acid and 2,4-dichloro-6-hydroxy-s-triazine, hardeners such as dioxane derivatives, divinyl ketones, isocyanates and carbodiimides, surfactants such as saponin, polyalkylene glycol, polyalkylene glycol ether, alkyl sulfonates, alkyl benzenesulfonates and alkyl naphthalenesulfonates, brightening agents, antistatic agents, antistaining agents, UV absorbents and stabilizers.

In the light-sensitive material of the present invention, the silver halide emulsion may contain a color coupler. The coupler may be 4-equivalent or 2-equivalent and may be a colored coupler for masking or a coupler which releases a developing inhibitor. The couplers which are advantageously used are chain-opened ketomethylene compounds such as acylacetamide for yellow dyes, pyrazolone compounds, pyrazolotriazole compounds and pyrazolotetrazole compounds for magenta dyes and phenol compounds and naphthol compounds for cyan dyes.

The light-sensitive material of the present invention can take any layer structure which ordinary light-sensitive materials can take.

EXAMPLE

The present invention is hereinafter described in more detail by means of the following examples.

Example 1

0.1 mol of each of the dyes represented by Formulae I, II or III and the dyes D-1 to D-4 listed in Tables 1 and 10.1 g (0.1 mol) of triethylamine were dissolved in 1000 ml of water, and 200 ml of a 1 mol/l aqueous solution of silver nitrate was added drop by drop with stirring. The resulting precipitate was collected by filtration, washed and dried to yield the desired silver salt of dye.

To 700 ml of a 3% aqueous solution of gelatin, 0.05 mol of the silver salt of dye described above and 30 ml of a 6.7% solution of surfactant Triton X-200 (produced by Rohm & Haas Co.) were added, and 2 kg of glass beads (1 mm diameter) were added, followed by pulverization for 8 hours using a medium agitation mill (Aquamizer QA-5, produced by Hosokawa Micron), to yield a dispersion of the silver salt of dye.

To 100 ml of each dispersion thus obtained, 0.1 g of bisvinylsulfonylmethyl ether H-1 as a gelatin hardener and a coating aid Su-1 were added, after which the dispersion was coated and dried on a cellulose triacetate film support, subbed with a gelatin layer, to a coating amount of each silver salt of dye of 0.001 mol/m$^2$, to yield sample Nos. 1-1 through 1-19.

Using the method described in Example 1 of Japanese Patent O.P.I. Publication No. 23441/1991, a fine dispersion of dye D-5 was prepared, and hardener H-1 and coating aid Su-1 were added in the same manner as with samples Nos. 1-1 through 1-19, and the resulting mixture was coated and dried on a cellulose triacetate film support, subbed with a gelatin layer, to a coating amount of dye of 0.001 mol/m$^2$, to yield sample No. 1-20.

In accordance with the method described in Examples 1 through 9 of Japanese patent O.P.I. Publication No. 291051/1988, an aqueous solution of gelatin containing dye D-6 and a polymer dispersion mordant in a ratio by volume of 1 part of the former to about 50 parts of the latter was coated and dried on a cellulose triacetate film support, subbed with a gelatin layer, to a coating amount of dye of 0.001 mol/m$^2$, to yield sample No. 1-21.

Dyes D-1–D-6 (comparison) used and the structure of coating aid Su-1 and the polymer dispersion mordant in the above-mentioned samples are shown in the following.

Dye D-1 (comparison)

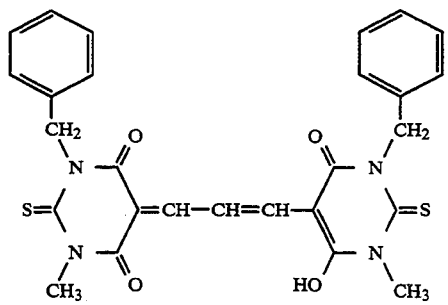

Dye D-2 (comparison)

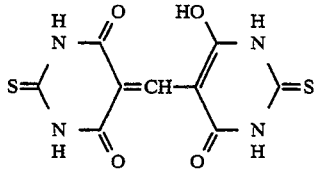

Dye D-3 (comparison)

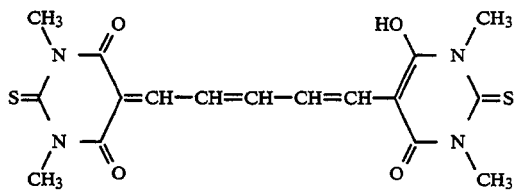

Dye D-4 (comparison)

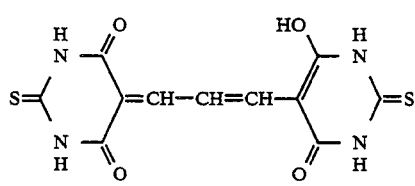

Dye D-5 (comparison)

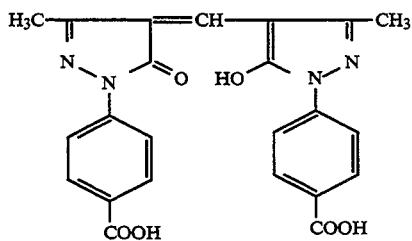

Dye D-6 (comparison)

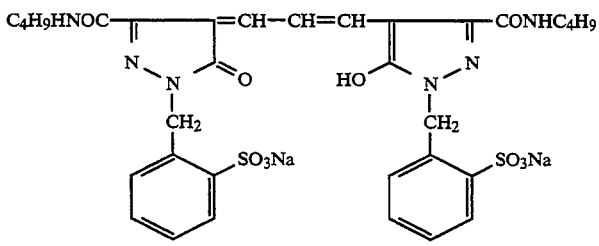

Japanese Pat. O.P.I. No. 139949/1988

Dye D-7 (comparison)

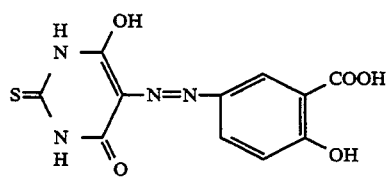

U.S. Pat. No. 2,266,441

[Su-1]

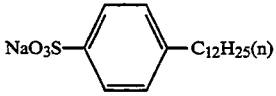

Polymer dispersion mordant

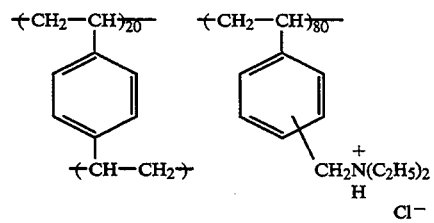

Samples Nos. 1-1 through 1-21 thus obtained were each processed with the following fixer A, alkali solution B and water at 20° C. for 15 seconds, washed and dried, after which they were subjected to spectrometry using a spectrophotometer, and the decoloring ratio at the maximum absorption wavelength, relative to the non-processed sample, was calculated using the following equation. The results are shown in Tables 1.

Decoloration ratio (%) = [1 - (processed sample concentration/non-processed sample concentration)] × 100

Fixer A

| | |
|---|---|
| Sodium thiosulfate | 240 g |
| Anhydrous sodium sulfite | 15 g |
| Glacial acetic acid | 15 g |
| Potassium aluminum sulfate | 15 g |

Water was added to make a total quantity of 1000 ml.

Alkali solution B

| | Potassium carbonate | 37.5 g |
|---|---|---|

Water was added to make a total quantity of 1000 ml, and 1N $H_2SO_4$ was added to obtain a pH of 10.2.

TABLE 1

| Sample No. | Dye | Decoloration ratio, after washed (%) | Decoloration ratio, after processed with alkali solution B (%) | Decoloration ratio, after processed with Fixer A (%) |
|---|---|---|---|---|
| I-1 (inventive) | I-1 | 0 | 0.4 | 97.5 |
| I-2 (inventive) | I-3 | 0 | 0.5 | 97.7 |
| I-3 (inventive) | I-6 | 0 | 0.6 | 97.7 |
| I-4 (inventive) | I-8 | 0 | 0.5 | 97.7 |
| I-5 (inventive) | I-24 | 0 | 0.7 | 97.9 |
| I-6 (inventive) | I-28 | 0 | 0.6 | 97.4 |
| I-7 (inventive) | II-2 | 0 | 0.7 | 97.7 |
| I-8 (inventive) | II-6 | 0 | 0.8 | 97.9 |
| I-9 (inventive) | II-9 | 0 | 0.6 | 97.6 |
| I-10 (inventive) | II-18 | 0 | 0.7 | 97.6 |
| I-11 (inventive) | III-2 | 0 | 0.8 | 97.9 |
| I-12 (inventive) | III-7 | 0 | 0.7 | 97.6 |
| I-13 (inventive) | III-8 | 0 | 0.8 | 97.9 |
| I-14 (inventive) | III-11 | 0 | 0.8 | 97.6 |
| I-15 (inventive) | III-13 | 0 | 0.7 | 97.6 |
| I-16 (comparative) | D-1 | 0 | 0.1 | 89.7 |
| I-17 (comparative) | D-2 | 0 | 1.3 | 88.7 |
| I-18 (comparative) | D-3 | 0 | 1.0 | 89.6 |
| I-19 (comparative) | D-4 | 0 | 1.8 | 88.3 |
| I-20 (comparative) | D-5 | 0 | 77.5 | 1.0 |
| I-21 (comparative) | D-6 | 0.8 | 51.3 | 1.6 |

From Table 1, it is evident that the silver salt of dye of the present invention is greater in bleaching rate with less color residence after fixation in comparison with the silver salts of comparative dyes D-1 through D-4. The dye of the present invention is also characterized by a higher bleaching effect by fixer processing in comparison with known comparative dyes D-5 and D-6. The silver salt of dye of the present invention was also found to possess good diffusion resistance comparable to that of the silver salts of comparative dyes and comparative non-diffusible dyes.

Example 2

Preparation of sample No. 2-1

A 10% aqueous solution of gelatin was coated on a cellulose triacetate film support, previously coated with a gelatin layer, to yield a first layer. Simultaneously, a light-sensitive silver halide emulsion layer and a surface protecting layer, which had the following compositions, were double coated on layer 1 to yield sample No. 2-1.

Composition of light-sensitive silver halide emulsion layer

Silver halide emulsion (monodispersed emulsion with uniform composition having an average grain size of 0.48 μm and an iodine content of 2 mol%)

| Gelatin | 3.2 g/m² |
|---|---|
| Additives | 1.6 g/g silver |
| Sensitizing dye | 4.8 × 10⁻⁴/mol silver |

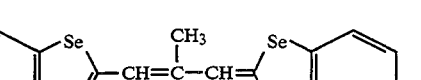

| Sodium dodecylbenzenesulfonate | 0.1 mg/m² |
|---|---|
| Composition of surface protecting layer | |
| Gelatin | 0.6 g/m² |
| Sodium N-oleoyl-N-methyltaurate | 0.2 g/m² |
| Bis-vinylsulfonylmethyl ether | 0.05 g/gelatin |

Preparation of sample Nos. 2-2 through 2-19

Multiple-layered photographic material sample Nos. 2-2 through 2-19 were prepared in the same manner as with sample No. 2-1 except that the 10% aqueous solution of gelatin for layer 1 was replaced with a dispersion prepared using each of the silver salts of dyes or the comparative dyes shown in Table 3 as directed in Example 1.

Samples Nos. 2-1 through 2-19 thus obtained were each subjected to white light exposure through an optical wedge and then processed in the following procedures to assess effects on photographic performance.

| Processing procedure (20° C.) | |
|---|---|
| Development | 2 minutes |
| Fixation | 3 minutes |
| Washing | 3 minutes |
| Drying | |
| The processing solutions used in the respective procedures had the following compositions: | |
| Developer | |
| Water | 500 ml |
| Hydroquinone | 8 g |
| Metol | 2 g |
| Anhydrous sodium sulfite | 90 g |
| Sodium carbonate monohydrate | 52.5 g |
| Potassium bromide | 5 g |
| Water was added to make a total quantity of 1 l. | |
| Fixer | |
| Water | 600 ml |
| Ammonium thiosulfate | 80 g |
| Anhydrous sodium sulfite | 5 g |
| Sodium bisulfite | 5 g |
| Water was added to make a total quantity of 1 l, and acetic acid was added to obtain a pH of 6.0. The results are shown in Table 2. | |

TABLE 2

| Sample No. | Dye in Gelatin layer 1 (molar amount/m²) | Effect on fogging | Remark |
|---|---|---|---|
| 2-1 (control) | Gelatin layer | 0.07 | — |
| 2-2 (Comparative) | Silver salt of D-1 (0.001) | 0.13 | — |
| 2-3 (Comparative) | Silver salt of D-2 | 0.14 | — |

TABLE 2-continued

| Sample No. | Dye in Gelatin layer 1 (molar amount/m²) | Effect on fogging | Remark |
|---|---|---|---|
| | (0.001) | | |
| 2-4 (Comparative) | Silver salt of D-3 (0.001) | 0.14 | — |
| 2-5 (Comparative) | Silver salt of D-4 (0.001) | 0.07 | Slight yellowing seen. |
| 2-6 (Comparative) | Silver salt of D-5 (0.001) | 0.08 | Minute aggregates observed in coated layer. |
| 2-7 (inventive) | Silver salt of I-1 (0.001) | 0.04 | — |
| 2-8 (inventive) | Silver salt of I-2 (0.001) | 0.03 | — |
| 2-9 (inventive) | Silver salt of I-5 (0.001) | 0.04 | — |
| 2-10 (inventive) | Silver salt of I-17 (0.001) | 0.04 | — |
| 2-11 (inventive) | Silver salt of I-24 (0.001) | 0.05 | — |
| 2-12 (inventive) | Silver salt of I-27 (0.001) | 0.04 | — |
| 2-13 (inventive) | Silver salt of II-2 (0.001) | 0.04 | — |
| 2-14 (inventive) | Silver salt of II-7 (0.001) | 0.03 | — |
| 2-15 (inventive) | Silver salt of II-8 (0.001) | 0.04 | — |
| 2-16 (inventive) | Silver salt of III-2 (0.001) | 0.05 | — |
| 2-17 (inventive) | Silver salt of III-7 (0.001) | 0.04 | — |
| 2-18 (inventive) | Silver salt of III-8 (0.001) | 0.04 | — |
| 2-19 (inventive) | Silver salt of III-11 (0.001) | 0.04 | — |

As shown in Table 2, comparative dyes D-1 through D-3 had slightly increased fogging density, indicating an effect on fogging. Although comparative dyes D-4 and D-5 did not affect fogging, yellowing occurred in D-4, and coatability was adversely affected in D-5. On the other hand, the silver salt of dye of the present invention did not affect coatability, having little effect on the silver halide in adjoining layers. The dye of the present invention was also found to have a good property of improved sharpness in comparison with sample No. 2-1.

Example 3

(Preparation of Sample 3-1)

On both sides of a polyethyleneterephthalate support provided with subbing on both sides, a 9% aqueous gelatin solution was coated to prepare the first layer. Concurrently with this, a light-sensitive silver halide emulsion layer and a surface protective layer were coated on both sides respectively on a multi-layer basis to prepare Sample 3-1.

(Composition of the light-sensitive silver halide emulsion layer)

Silver halide emulsion (Mono-dispersed and uniform-composed emulsion containing a 2 mol % silver iodide having an average grain of 0.7 μm subjected to chemical sensitization by means of chloro aurate and hypo) 2.8 g/m² in terms of silver amount on one side

| | |
|---|---|
| Gelatin | 0.7 g/1 g of silver |
| Additive | |
| Sensitizing dye (A) | 7.8 mg/m² |

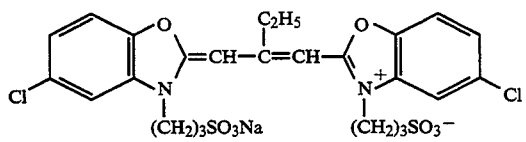

| | |
|---|---|
| Sensitizing dye (B) | 0.39 mg/m² |

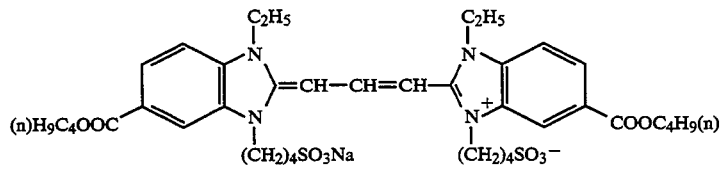

| | |
|---|---|
| t-butyl-catechol | 10.4 mg/m² |
| Polyvinyl pyrrolidone (the molecular weight is 10,000) | 26 mg/m² |
| Styrene-maleic acid anhydride copolymer | 65 mg/m² |
| Trimethylolpropane | 260 mg/m² |
| Diethyleneglocol | 130 mg/m² |
| Nitrophenyl-triphenylphosphoniumchloride | 1.3 mg/m² |
| Amonium 1,3-dihydroxybenze-4-sulfonate | 104 mg/m² |
| Sodium 2-mercaptobenzimidazole-5 sulfonate | 0.1 mg/m² |

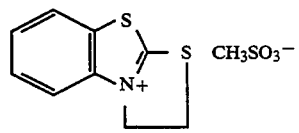

1.8 mg/m²

| | |
|---|---|
| nC$_4$H$_9$OCH$_2$CHCH$_2$N(CH$_2$COOH)(CH$_2$COOH), OH | 26 mg/m$^2$ |
| 1,1-dimethylol-1-bromo-1-nitromethane | 0.3 mg/m$^2$ |
| 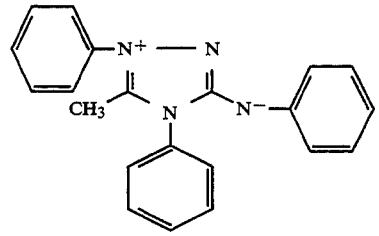 | 3.9 mg/m$^2$ |

(Composition of the surface protective layer)

| | |
|---|---|
| Gelatin | 0.9 mg/m$^2$ |
| C$_9$H$_{19}$-C$_6$H$_3$(C$_9$H$_{19}$)-O(CH$_2$CH$_2$O)$_{12}$-SO$_3$Na | 11 mg/m$^2$ |
| C$_9$H$_{19}$-C$_6$H$_3$(C$_9$H$_{19}$)-O(CH$_2$CH$_2$O)$_{12}$-H | 2 mg/m$^2$ |
| NaO$_3$S—CHCOO(CH$_2$)$_2$CH(CH$_3$)$_2$, CH$_2$COO(CH$_2$)$_9$CH$_3$ | 6 mg/m$^2$ |
| 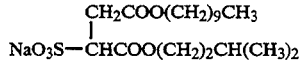 (A mixture where n represents 2 to 5.) | 14 mg/m$^2$ |
| NaO$_3$S—CHCOOCH$_2$(C$_2$F$_4$)$_3$H, CH$_2$COOCH$_2$(C$_2$F$_4$)$_3$H | 5 mg/m$^2$ |
| F$_{19}$C$_9$—O(CH$_2$CH$_2$O)$_{10}$CH$_2$CH$_2$OH | 3 mg/m$^2$ |
| Matting agent composed of polymethylmethacrylate having an average grain size of 7 μm | 7 mg/m$^2$ |
| colloidal silica having an average grain size of 0.013 μm | 63 mg/m$^2$ |
| Sodium 2-hydroxy-4,6 dichlorotriazine | 25 mg/m$^2$ |

(Preparation of Samples 3-2 through 3-17)

Multi-layer photographic elements (Samples 3-2 through 3-17) were prepared in the same manner as Sample 3-1 except that a 9% aqueous gelatin solution of the first layer in Sample 3-1 was replaced with a dispersed solution prepared using dyes represented by (I), (II) and (III) of the present invention as shown in Table 3 and dyes D-1 through D-5 in accordance with Example 1.

(Preparation of Sample 3-18)

A multi-layer photographic element (Sample 3-18) was prepared in the same manner as Sample 3-1 except that a 9% aqueous gelatin solution of the first layer in Sample 3-1 was replaced with a dispersed solution of silver salt of Dye D-7 prepared in accordance with Example 1.

After the samples 3-1 through 3-18 prepared in the above-mentioned manner were respectively regulated in terms of humidity under 23° C. and 50% RH, they were sealed tightly. Then, they were stored for 4 days under 50° C. and 20% RH for evaluation.

They were exposed to light in the following manner: Standard light B described in *Data Book on Illumination, New Edition* was used as a light source. The same amount of light (3.2 cms respectively) was given to both sides of each films without a filter for an exposure time of 0.1 seconds. Samples were, after being exposed to light, subjected to 45 seconds processing using XD-SR developing solution in an automatic processing machine Model SRX-501 (produced by Konica Corporation). Then, they were subjected to fixing, washing and drying. With regard to sensitivity, an inverse number of the amount of light necessary for increasing blackened density by 1.0 was calculated, and the sensitivity of samples after being stored was represented by relative sensitivities when the sensitivity of samples before storage are defined to be 100.

| Sample | Dye | Relative sensitivity after being stored for 4 days under 50° C. and 20% Rh |
|---|---|---|
| 3-1 | I-1 | 88 |
| 3-2 | I-4 | 86 |
| 3-3 | I-10 | 90 |
| 3-4 | I-29 | 87 |
| 3-5 | II-2 | 89 |
| 3-6 | II-10 | 92 |
| 3-7 | II-12 | 87 |
| 3-8 | II-16 | 91 |
| 3-9 | III-2 | 90 |
| 3-10 | III-3 | 87 |
| 3-11 | III-6 | 89 |
| 3-12 | III-9 | 90 |
| 3-13 | D-1 | 73 |
| 3-14 | D-2 | 70 |
| 3-15 | D-3 | 72 |
| 3-16 | D-4 | 71 |
| 3-17 | D-5 | 69 |
| 3-18 | D-7 | 73 |

EFFECT OF THE INVENTION

As dyes of the present invention, those having desirable absorption spectral property can be selected depending upon an application. In addition, though they have anti-diffusion properties, they have excellent dissolution property and decoloring property in photographic processing steps and they do not adversely affect photographic properties in terms of fogging and desensitization. Accordingly, the present invention can provide a silver halide photographic light-sensitive material wherein no stain is caused even in rapid photographic processing, no deterioration in photographic properties in terms of fogging and desensitization is caused and no photographic properties are affected adversely during storage.

What is claimed is:

1. A silver halide photographic light-sensitive material comprising a support having thereon a hydrophilic colloidal layer comprising at least one silver salt of a compound having at least one acid group in the molecule, and the compound is represented by Formula I, Formula II or Formula III:

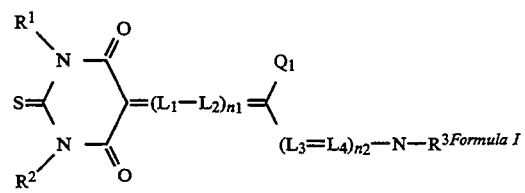

Formula I wherein $R^1$ and $R^2$ independently represent a hydrogen atom or a group selected from the group consisting of an alkyl group, an alkenyl group, an aryl group and a heterocyclic residue; $L_1$, $L_2$, $L_3$ and $L_4$ independently represent a methine group; $n_1$ is an integer of 0 to 3; $n_2$ is an integer of 0, 1 or 2 and $R^3$ represents an alkyl group or an alkenyl group. $Q_1$ represents a non-metal atom group necessary to complete a 5-membered or 6-membered heterocyclic ring;

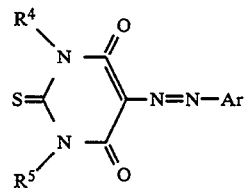

Formula II wherein $R^4$ and $R^5$ independently represent a hydrogen atom or a group selected from the group consisting of an alkyl group, an alkenyl group, an aryl group, and a heterocyclic residue provided that $R^4$ and $R^5$ are not hydrogen atoms at the same time, and Ar represents an aryl group; and

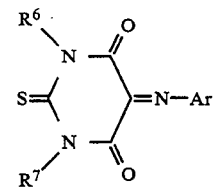

Formula III wherein $R^6$ and $R^7$ independently represent a hydrogen atom or a group selected from the group consisting of an alkyl group, an alkenyl group, an aryl group, and a heterocyclic residue provided that $R^6$ and $R^7$ are not hydrogen atoms at the same time; and Ar represents an aryl group.

2. The silver halide photographic light-sensitive material of claim 1, wherein the silver salt of the compound is contained in a silver halide emulsion layer.

3. The silver halide photographic light-sensitive material of claim 1, wherein the material comprises a filter layer or an anti-halation layer, and the filter layer or the anti-halation layer containing 0.05 to 2.0 g/m² of the silver salt of the compound.

4. The silver halide photographic light-sensitive material of claim 1, wherein the material comprises a filter layer or an anti-halation layer, and the filter layer or the anti-halation layer containing 0.1 to 1.0 g/m² of the silver salt of the compound.

5. The silver halide photographic light-sensitive material of claim 3, wherein an amount of gelatin added to the filter layer or the anti-halation layer is 0.3 to 1.5 g/m².

6. The silver halide photographic light-sensitive material of claim 3, wherein a amount of gelatin added to the filter layer or the anti-halation layer is 0.5 to 1.0 g/m².

7. The silver halide photographic light-sensitive material of claim 3, wherein a ratio of the amount of the silver salt of the compound contained in the filter layer or the anti-halation layer and the amount of gelatin added contained therein is within the range of 0.1 to 2.0.

8. The silver halide photographic light-sensitive material of claim 1, wherein the acid group is selected from a sulfo group, a carboxyl group and a phosphonic acid group.

* * * * *